United States Patent
Bartlett et al.

(10) Patent No.: US 10,416,842 B1
(45) Date of Patent: Sep. 17, 2019

(54) CLARITY IN MODEL-BASED DESIGN

(71) Applicant: The Mathworks, Inc., Natick, MA (US)

(72) Inventors: Andrew C. Bartlett, Westborough, MA (US); Jay R. Torgerson, Hopkinton, MA (US)

(73) Assignee: The MathWorks, Inc., Natick, MA (US)

( * ) Notice: Subject to any disclaimer, the term of this patent is extended or adjusted under 35 U.S.C. 154(b) by 389 days.

(21) Appl. No.: 14/861,021

(22) Filed: Sep. 22, 2015

(51) Int. Cl.
| | | |
|---|---|---|
| *G06F 3/048* | (2013.01) | |
| *G06F 3/0482* | (2013.01) | |
| *G06F 17/50* | (2006.01) | |
| *G06F 3/0481* | (2013.01) | |
| *G06F 3/0484* | (2013.01) | |
| *G06F 3/01* | (2006.01) | |

(52) U.S. Cl.
CPC ........ *G06F 3/0482* (2013.01); *G06F 3/04817* (2013.01); *G06F 3/04842* (2013.01); *G06F 3/04845* (2013.01); *G06F 3/04847* (2013.01); *G06F 17/5009* (2013.01)

(58) Field of Classification Search
CPC .... G06Q 10/067; G06Q 10/06; G06Q 10/103; G06Q 10/04; G06Q 10/0637; G06F 19/12; G06F 19/24; G06F 19/3437
See application file for complete search history.

(56) References Cited

U.S. PATENT DOCUMENTS

| | | | | |
|---|---|---|---|---|
| 5,980,096 | A * | 11/1999 | Thalhammer-Reyero | ................... G05B 17/02 |
| 6,832,263 | B2 * | 12/2004 | Polizzi | ................. G06F 16/954 709/246 |
| 6,895,409 | B2 * | 5/2005 | Uluakar | .................... G06F 8/20 707/769 |
| 8,359,183 | B1 * | 1/2013 | Aldrich | ............... G06F 17/5022 703/2 |
| 9,569,179 | B1 * | 2/2017 | Kachmar | ................. G06F 8/30 |
| 10,096,025 | B2 * | 10/2018 | Desai | ..................... G06Q 20/08 |
| 2002/0038206 | A1 * | 3/2002 | Dori | ...................... G06F 17/289 703/22 |
| 2004/0148586 | A1 * | 7/2004 | Gilboa | ...................... G06F 8/38 717/108 |
| 2005/0022160 | A1 * | 1/2005 | Uluakar | .................... G06F 8/20 717/105 |
| 2005/0171746 | A1 * | 8/2005 | Thalhammer-Reyero | ................... G05B 17/02 703/2 |
| 2007/0132779 | A1 * | 6/2007 | Gilbert | .................. G06F 9/4488 345/619 |

(Continued)

*Primary Examiner* — Nicholas Augustine
(74) *Attorney, Agent, or Firm* — Wolf, Greenfield & Sacks, P.C.

(57) ABSTRACT

A device may identify a primary model element of a set of model elements. The device may select one or more secondary model elements of the set of model elements. The one or more secondary model elements may be associated with the primary model element. The device may consolidate the one or more secondary model elements into a representation of the one or more secondary model elements. The representation of the one or more secondary model elements may be associated with the primary model element. The device may selectively de-consolidate the representation of the one or more secondary model elements based on detecting at least one of a user interaction or a run-time event.

29 Claims, 12 Drawing Sheets

(56) References Cited

U.S. PATENT DOCUMENTS

| | | | |
|---|---|---|---|
| 2007/0162268 A1* | 7/2007 | Kota | G06F 17/5022 |
| | | | 703/14 |
| 2009/0007062 A1* | 1/2009 | Gilboa | G06Q 10/06 |
| | | | 717/105 |
| 2010/0083212 A1* | 4/2010 | Fritzsche | G06F 8/34 |
| | | | 717/104 |
| 2010/0131883 A1* | 5/2010 | Linthicum | G06F 19/00 |
| | | | 715/771 |
| 2010/0162208 A1* | 6/2010 | Amid | G06F 8/10 |
| | | | 717/107 |
| 2010/0325578 A1* | 12/2010 | Mital | G06T 19/20 |
| | | | 715/805 |
| 2011/0093379 A1* | 4/2011 | Lane | G06Q 40/04 |
| | | | 705/37 |
| 2013/0138575 A1* | 5/2013 | Zabrovarnyy | G06F 8/10 |
| | | | 705/348 |
| 2015/0094996 A1* | 4/2015 | Barberis | G06F 17/5009 |
| | | | 703/2 |
| 2015/0220311 A1* | 8/2015 | Salter | G06F 8/34 |
| | | | 717/105 |
| 2015/0222495 A1* | 8/2015 | Mehta | G05B 23/0272 |
| | | | 715/736 |

\* cited by examiner

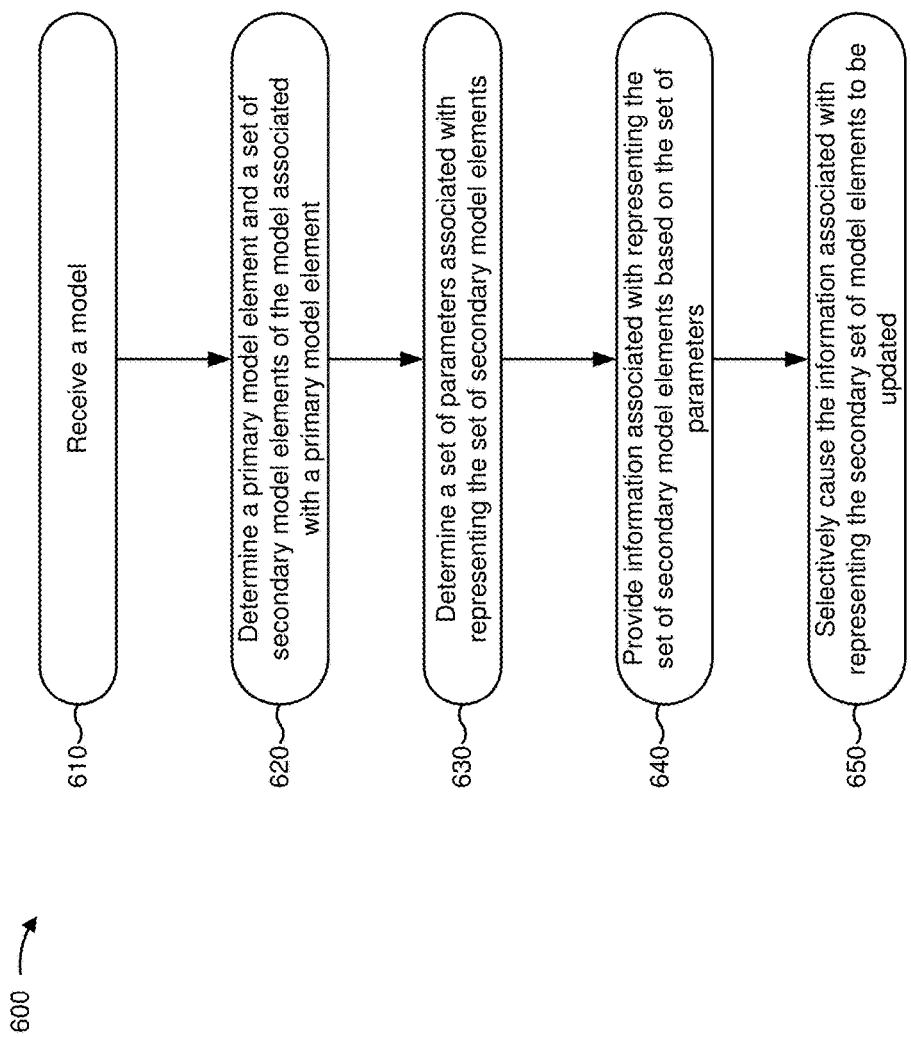

CLARITY IN MODEL-BASED DESIGN

BRIEF DESCRIPTION OF THE DRAWINGS

FIG. 6 is a flow chart of an example process for consolidating a set of secondary model elements.

DETAILED DESCRIPTION

The following detailed description of example implementations refers to the accompanying drawings. The same reference numbers in different drawings may identify the same or similar elements.

A user may utilize a model (e.g., a graphical model) to simulate a system, simulate output of a mathematical equation, or the like. The model may include primary model elements, associated with a high-level model, and secondary model elements associated with a detailed embedded-ready model. The high-level model may be designed to include primary model elements associated with representing an algorithm associated with the system that is being simulated. The detailed embedded-ready model may include secondary model elements that operate in connection with the primary model elements of the high-level model, such as conditional statements, data type conversions, signal specifications, or the like. The detailed embedded-ready model may be more difficult to understand than the high-level model because of the presence of secondary model elements associated with ensuring that primary model elements function properly. Implementations, described herein, may represent secondary model elements in a particular manner, such as by consolidating secondary model elements into a single graphical element, such as a badge, a fuse-panel, a bumper, or the like, to reduce visual noise and clarify the model.

Figure 1:
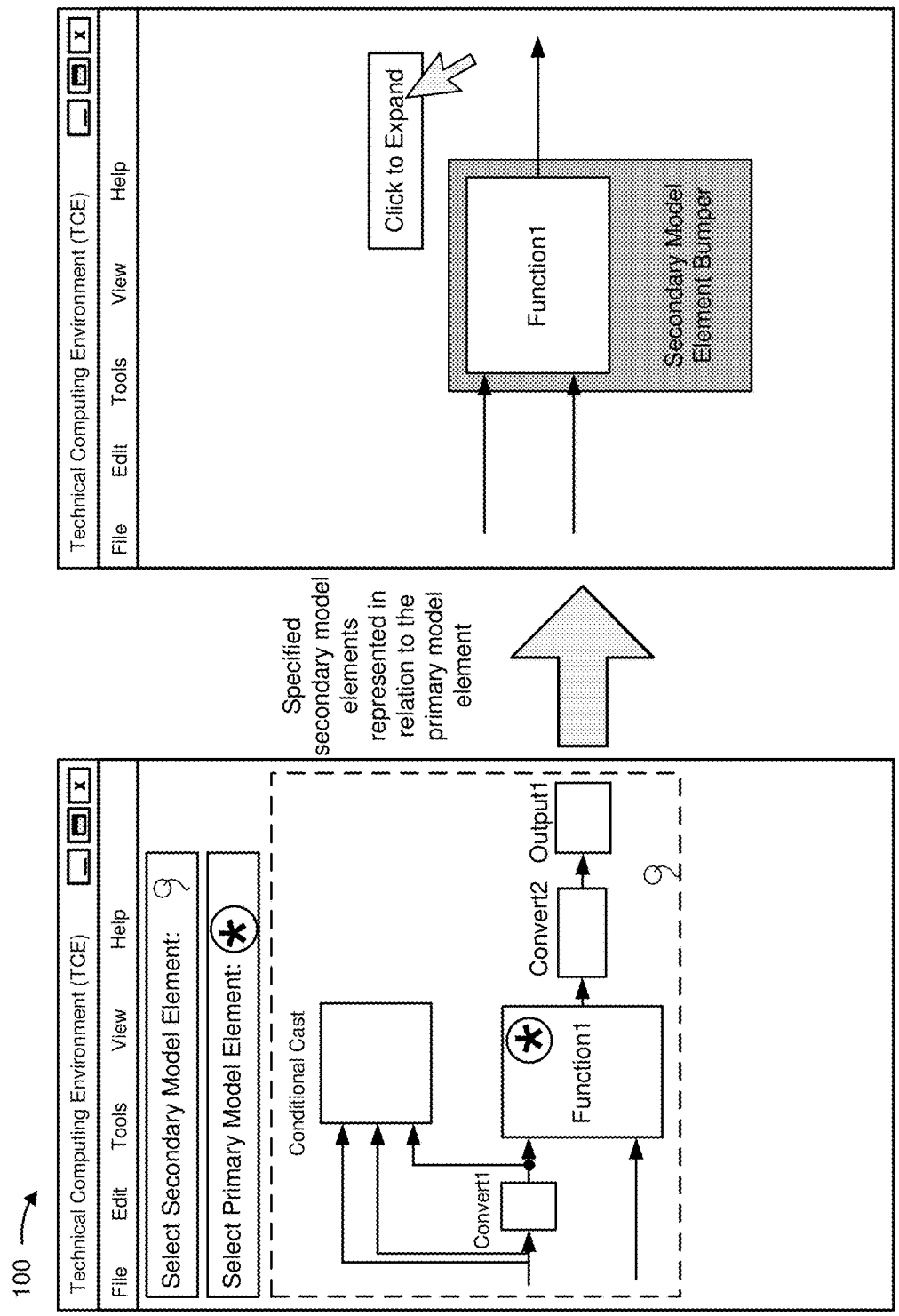
FIG. 1 is a diagram of an overview of an example implementation described herein.

FIG. 1 is a diagram of an overview of an example implementation 100 described herein. As shown in FIG. 1, example implementation 100 may include a technical computing environment (TCE) associated with a user interface. In example implementation 100, the user interface may display a model that includes a set of model elements. The set of model elements may include a first model element (e.g., "Convert1" associated with converting an signal), a second model element (e.g., "Conditional Cast" associated with determining whether Convert1 is to convert the signal), a third model element (e.g., "Function1" associated with performing some operation that the model is simulating), a fourth model element (e.g., "Convert2" associated with converting another signal), and a fifth model element (e.g., "Output1").

As further shown in FIG. 1, a user may indicate that Function1 is a primary model element using a particular indicator. The TCE may provide, via the user interface, confirmation of the primary model element. For example, the TCE may label Function1 with an asterisk to indicate that Function1 is selected as the primary model element. In some implementations, a client device operating the TCE may determine that Function1 is a primary model element based on processing information associated with the model. The user may indicate that other model elements of the model are secondary model elements. For example, the user may utilize a "lasso" tool to select a set of secondary model elements for consolidation. In some implementations, the client device operating the TCE may identify a secondary model element associated with the primary model element based on comparing the model to other models, based on comparing the primary model element to other primary model elements, or the like.

With regard to FIG. 1, the user may provide information identifying a set of parameters associated with representing the set of second model elements. For example, the user may provide information indicating a type of representation to utilize, such as a bumper representation, a fuse panel representation, a badge representation, an invisible block representation (e.g., a block that is consolidated into a connector that provides a signal to the block and transfers a signal from the block and may be interacted with when another block is dragged over the block, or the like), a text representation, or the like. Additionally, or alternatively, the user may provide information identifying when secondary model elements are to be displayed, such as displaying one or more secondary model elements in response to a mouse-over, a right-click, a mode of operation, a condition being satisfied, a granularity level being selected, or the like. The client device operating the TCE may consolidate the secondary model elements and represent the secondary model elements via the selected type of representation (e.g., a graphical alteration to the secondary model elements, a graphical alteration to the primary model element, etc.), thereby providing a visual representation of a model that is easier to understand. For example, the set of secondary model elements may be consolidated into a bumper representation that indicates that the set of secondary model elements operates on inputs to Function1 and the output of Function1. The bumper representation may refer to a graphical border surrounding the inputs and output of Function1. In some implementations, based on a user interaction with a button, the bumper may expand and de-consolidate the set of secondary model elements, thereby providing the secondary model elements for view when the user desires greater granularity of view of the model. In some implementations, a bumper may surround multiple primary model elements and include one or more secondary model elements.

In this way, a user interface may selectively provide a set of model elements designated as secondary model elements for display, thereby reducing visual noise associated with the set of model elements when a user does not need to view the set of model elements. Additionally, graphical modeling may be improved by increased granularity as a result of the ability to indicate that portions of a model are diagnostic portions not utilized as part of a core portion of the model.

In another example, a secondary model element that is associated with performing one or more interface functionalities (e.g., a data type conversion, a unit conversion, a sample rate conversion, a dimensionality conversion, a complexity conversion, an order conversion, a location conversion, or the like) for a primary model element may be consolidated as a bumper associated with the primary model element. For example, when a primary model element is associated with receiving a 16-bit integer input and is utilized with another model element that provides a 32-bit integer signal to the primary model element, a secondary model element, which performs data type conversions from 32-bit integers to 16-bit integers, may be consolidated as a bumper for the primary model element. Similarly, when a primary model element outputs a first type of signal via a first output port and a second type of signal via a second output port and another model element is associated with receiving the second type of signal via a first input port and the first type of signal via a second input port, a secondary model element, which is associated with reversing a port order of two signals, may be consolidated as a bumper for the primary model element.

In another example, a secondary model element that provides signal conditioning functionalities for a primary model element may be consolidated as a bumper or another type of consolidation for the primary model element. For example, when a primary model element receives a signal that is associated with an amount of noise in the signal that exceeds a threshold, a secondary model element associated with filtering noise from the signal may be utilized as a bumper for the primary model element. Similarly, a secondary model element may be utilized as a bumper associated with an output port of a primary model element to reduce a quantity of noise in an output signal. In another example, a secondary model element may alter a rate change associated with an input signal or output signal as an interface functionality for a primary model element. In this way, the secondary model element provides interface functionalities for a primary model element without the interface functionalities reducing readability of important aspects of the model.

Figure 2:
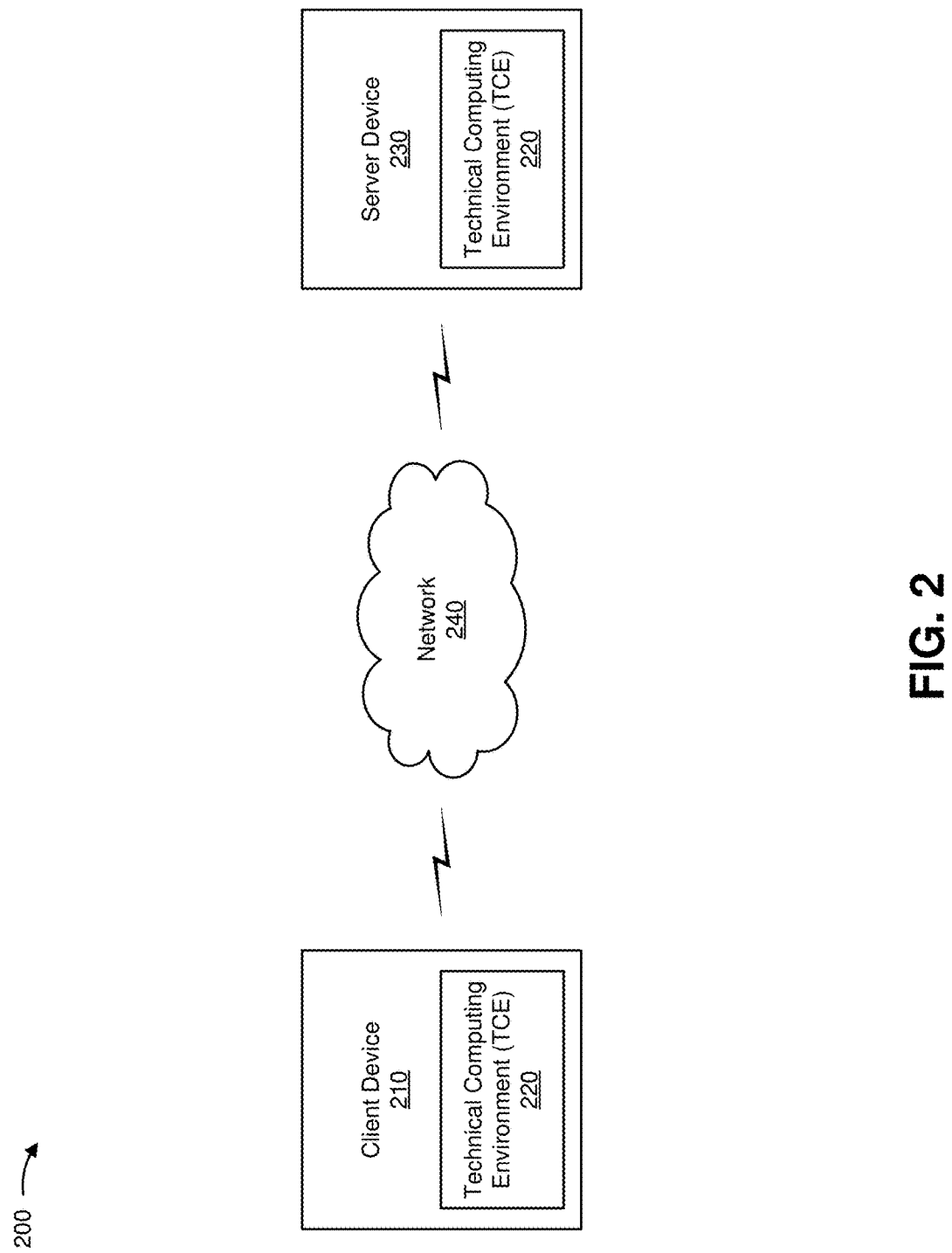
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, which may include a technical computing environment (TCE) 220. Furthermore, environment 200 may include a server device 230, which may include TCE 220, and a network 240. Devices of environment 200 may interconnect via wired connections, wireless connections, or a combination of wired and wireless connections.

Client device 210 may include one or more devices capable of receiving, generating, storing, processing, and/or providing information associated with a model (e.g., a model element, a block, an input signal, a portion of program code, or the like). For example, client device 210 may include a computing device, such as a desktop computer, a laptop computer, a tablet computer, a mobile phone (e.g., a smart phone, a radiotelephone, etc.), or a similar device. Client device 210 may designate a set of model elements as secondary model elements that are selectively displayed based on a user indication, based on an operating mode of the model, or the like. An operating mode of the model may refer to whether the model is being executed, edited, or the like. Additionally, or alternatively, the secondary model elements may be displayed based on a display mode, such as a read-only view mode, a documentation view mode, a model analysis view mode (e.g., that is associated with providing information associated with model coverage, code coverage, profiling analysis, or the like), or another type of mode. In some implementations, the second model elements may be displayed upon an occurrence of a threshold value of a variable associated with the model, execution of a particular model element, or the like. In some implementations, client device 210 may provide a graphical user interface (GUI) for viewing and/or interacting with a model and/or one or more features associated therewith. In some implementations, client device 210 may receive information from and/or transmit information to server device 230.

Client device 210 may host TCE 220. TCE 220 may include any hardware-based component or a combination of hardware and software-based components that provides a computing environment that allows tasks to be performed (e.g., by users) related to disciplines, such as, but not limited to, mathematics, science, engineering, medicine, and business. TCE 220 may include a text-based environment (e.g., MATLAB® software by The MathWorks, Inc.; Octave; Python; JavaScript; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; Modelica or Dymola from Dassault Systemes; etc.), a graphically-based environment (e.g., Simulink® software, Stateflow® software, SimEvents® software, SimscapeTM software etc., by The MathWorks, Inc.; VisSim by Visual Solutions; LabView® by National Instruments; Agilent VEE by Agilent Technologies; Advanced Design System (ADS) by Agilent Technologies; Agilent Ptolemy by Agilent Technologies; etc.), or another type of environment, such as a hybrid environment that may include, for example, a text-based environment and a graphically-based environment. In some implementations, TCE 220 may include, for example, a user interface and/or enable simulation and execution of hardware and/or software systems. In some implementations, TCE 220 may include a high-level architecture (HLA) that facilitates performing a simulation, such as performing a distributed simulation.

TCE 220 may be integrated with or operate in conjunction with a modeling environment, which may provide graphical tools for constructing models (e.g., graphical models) of systems and/or processes. TCE 220 may include additional tools, such as tools designed to convert a model into an alternate representation, such as an alternate model format, code or a portion of code representing source computer code and/or compiled computer code, a hardware description (e.g., a specification of a digital circuit, a description of a circuit layout, etc.), or the like. TCE 220 may also include tools to convert a model into project files for use in an integrated development environment (IDE) such as Eclipse by Eclipse Foundation, IntelliJ IDEA by JetBrains or Visual Studio by Microsoft. A model (e.g., a graphical model) may include one or more model elements that simulate characteristics of a system and/or a process. Each model element may be associated with a graphical representation thereof that may include a set of objects, such as one or more blocks (e.g., block diagram blocks), ports, connector lines, or the like.

Server device 230 may include one or more devices capable of receiving, generating, storing, processing, and/or providing a model and/or information associated with a model. For example, server device 230 may include a computing device, such as a server, a desktop computer, a laptop computer, a tablet computer, or a similar device. In some implementations, server device 230 may host TCE 220. In some implementations, client device 210 may be used to access one or more TCEs 220 running on one or more server devices 230. For example, multiple server devices 230 may be used to execute program code (e.g., serially or in parallel) and may provide respective results of executing the program code to client device 210. In some implementations, server device 230 may include multiple TCEs 220, such as via a set of virtual machines.

In some implementations, client device 210 and server device 230 may be owned by different entities. For example, an end user may own client device 210, and a third party may own server device 230. In some implementations, server device 230 may include a device operating in a cloud computing environment. In this way, front-end applications (e.g., a user interface) may be separated from back-end applications (e.g., program code execution).

Network 240 may include one or more wired and/or wireless networks. For example, network 240 may include a cellular network, a public land mobile network (PLMN), a local area network (LAN), a wide area network (WAN), a metropolitan area network (MAN), a telephone network (e.g., the Public Switched Telephone Network (PSTN)), an ad hoc network, an intranet, the Internet, a fiber optic-based network, a private network, a cloud computing network, and/or a combination of these or other types of networks. In some implementations, network 240 may include one or more heterogeneous networks, such as a set of networks including an open-public network, a private network, or the like.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
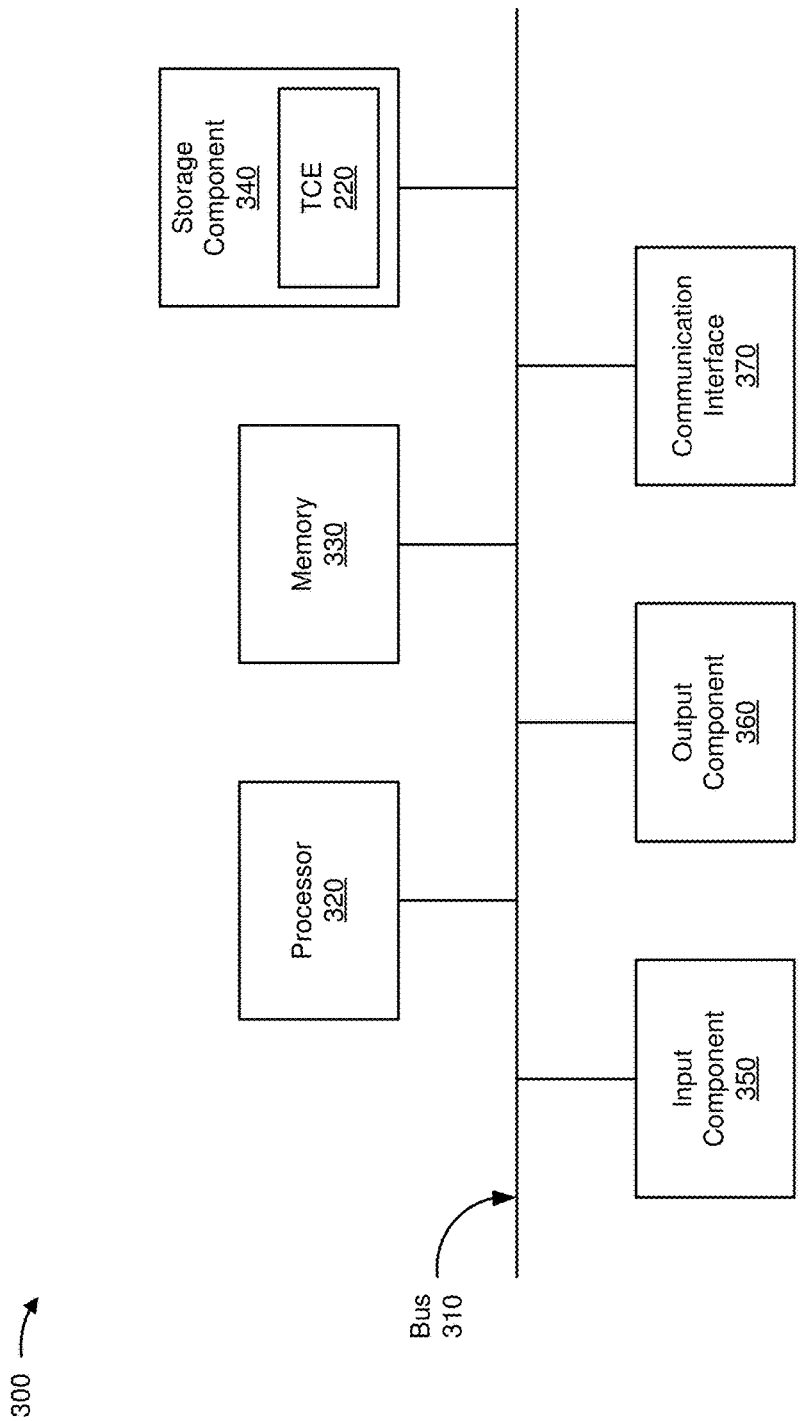
FIG. 3 is a diagram of example components of one or more devices of FIG. 2.

FIG. 3 is a diagram of example components of a device 300. Device 300 may correspond to client device 210 and/or server device 230. In some implementations, client device 210 and/or server device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions, and/or that is designed to implement one or more computing tasks. In some implementations, processor 320 may include multiple processor cores for parallel computing. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive. In some implementations, storage component 340 may store TCE 220.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIGS. 4A-4G are diagrams of an example implementation 400 of consolidating a set of secondary model elements.

Figure 4A:
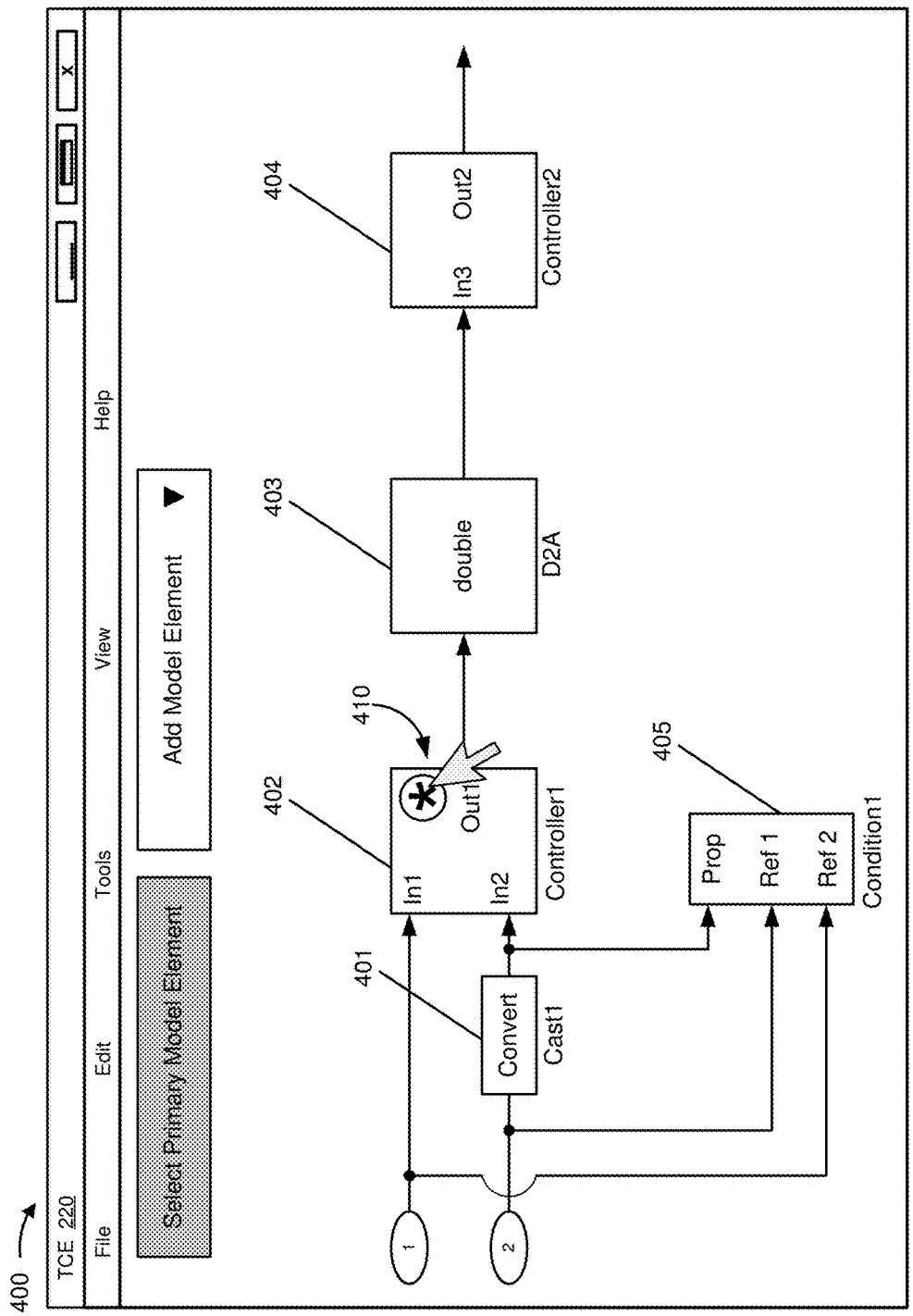
FIGS. 4A-4G are diagrams of an example implementation of consolidating a set of secondary model elements.

As shown in FIG. 4A, a model may include a set of model elements. For example, Cast1 is a model element 401 associated with converting a signal. In this example, Controller1 is a model element 402 associated with performing a particular algorithm on a set of input signals In1 and In2 to produce and output a signal via Out1. In this example, D2A is a model element 403 associated with performing a mathematical operation on a signal of Out1. In this example, Controller2 is a model element 404 associated with receiving a signal input via In3 and performing another algorithm to generate a signal output provided via Out2. In this example, Condition1 is a model element 405 associated with evaluating a condition of signals being provided to In1 and In2 and performing a conversion operation (e.g., converting a data type of the signal to a double type) based on evaluating the condition. Collectively, model elements 401-405 are associated with simulating the behavior of a system. As shown by reference number 410, a user designates model element 402 as a primary model element based on a user interaction with the user interface, such as by clicking on model element 402. TCE 220 may cause the user interface to display an indication that model element 402 is designated as the primary model element. For example, TCE 220 may cause an asterisk to be displayed on model element 402.

Figure 4B:
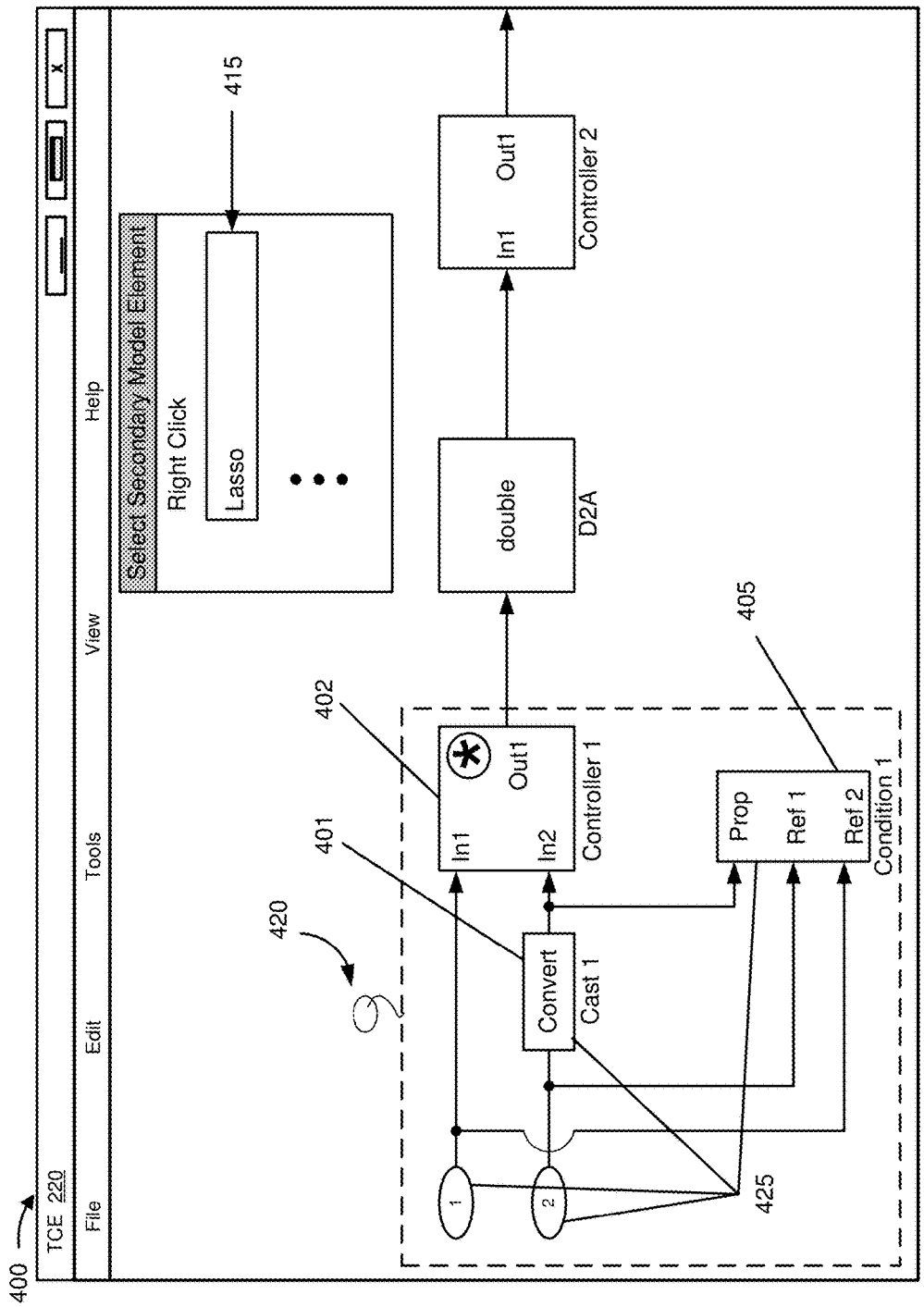

As shown in FIG. 4B, and by reference number 415, a user selects a selection tool for designating a set of secondary model elements associated with primary model element 402. For example, the user selects the lasso tool. As shown by reference number 420, the user forms a selection area around a set of model elements. As shown by reference number 425, the selection area includes a set of input blocks (e.g., "1" and "2"), model element 401, and model element 405. Assume that client device 210 omits primary model element 402 from the selection area because primary model element 402 has already been designated as primary.

Figure 4C:
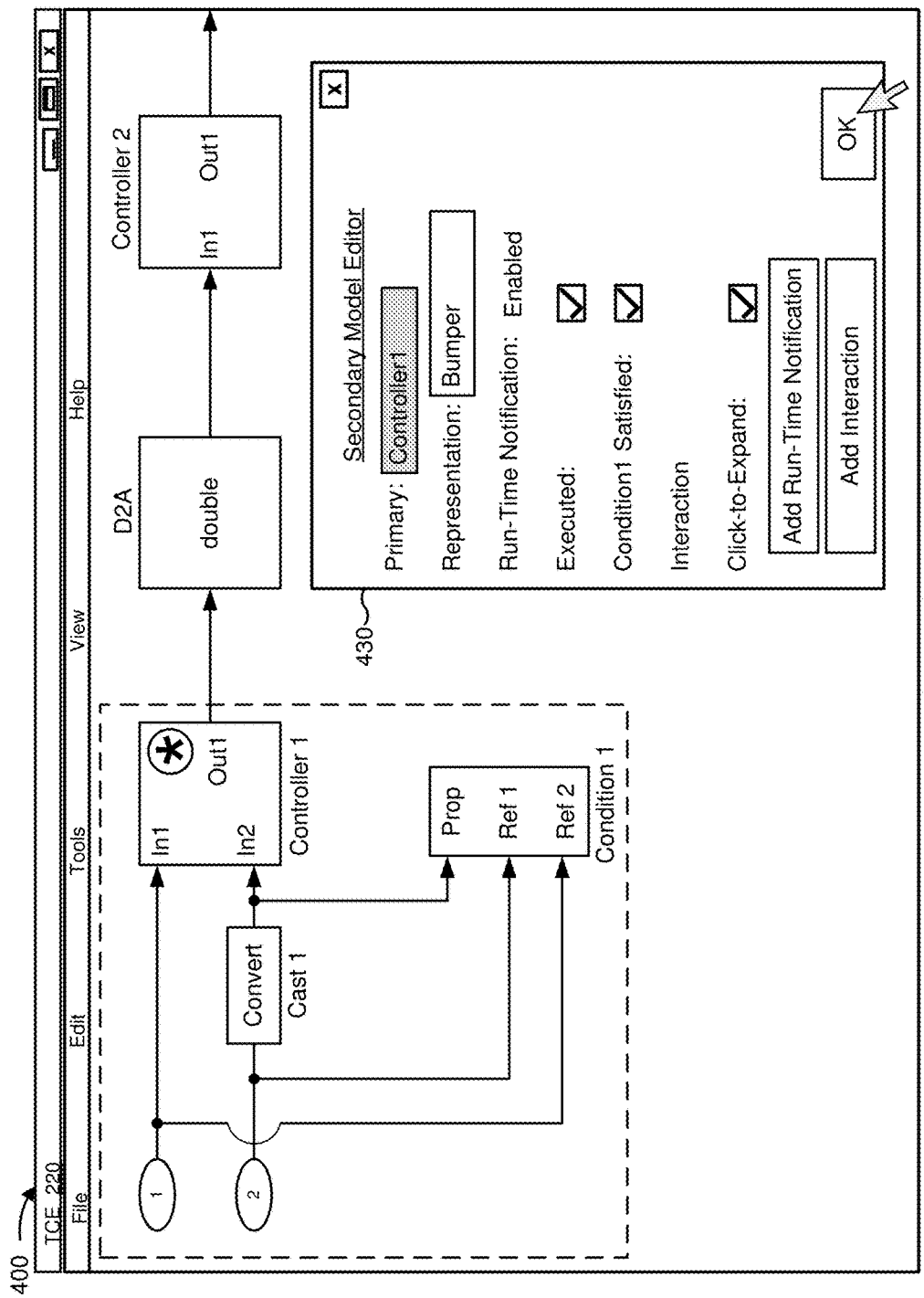

As shown in FIG. 4C, and by reference number 430, client device 210 provides, via the user interface, a set of options for selecting parameters associated with designating the set of model elements as secondary model elements. For example, the "Secondary Model Editor" indicates that Controller1 has been selected as a primary model element. The user selects a particular type of representation (e.g., "Bumper") for the secondary model elements. The user selects a set of run-time notifications. A run-time notification may refer to a condition upon which the bumper may expand. For example, the user indicates that the bumper is to expand when model elements of the bumper are executed and when a condition associated with Condition1 is satisfied. The user also selects a response to a type of interaction associated with the secondary model elements. For example, the user selects that the bumper is also to expand when clicked by the user.

Figure 4E:
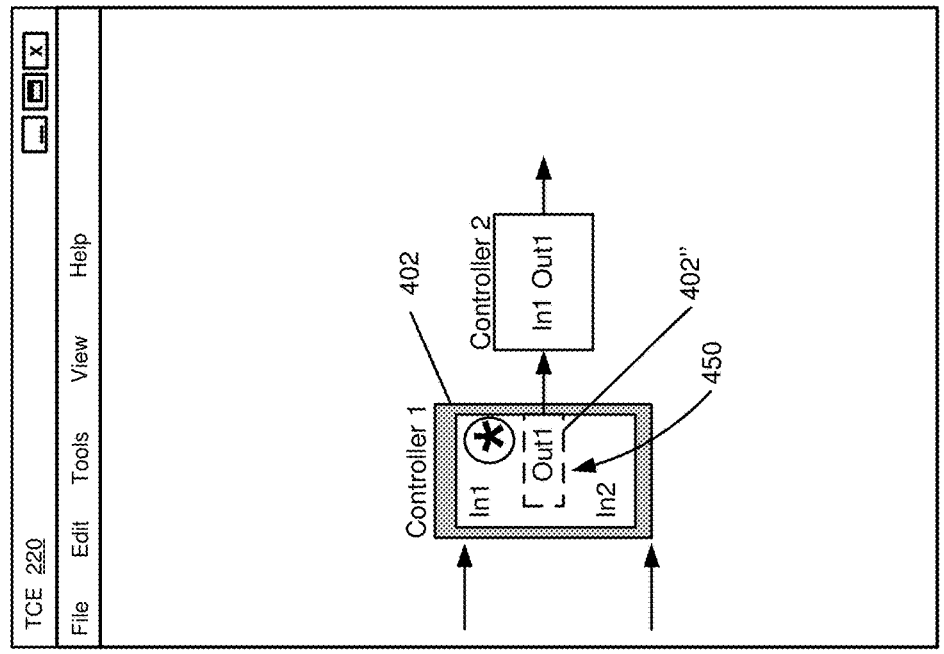
Figure 4D:
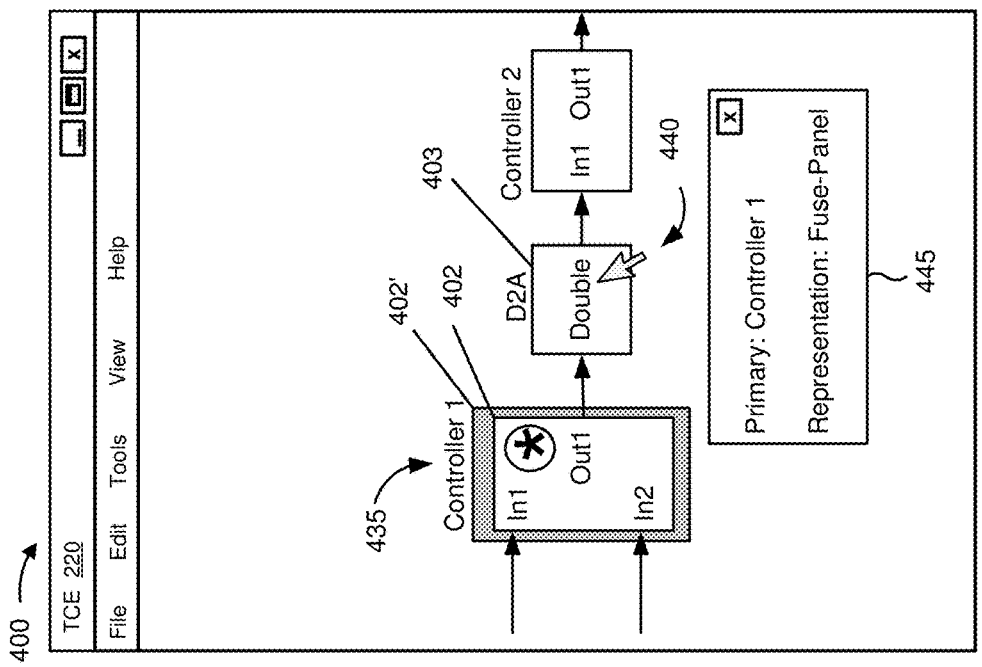

As shown in FIG. 4D, and by reference number 435, the set of secondary model elements are consolidated into a bumper surrounding model element 402, collectively being designated secondary model elements 402'. In another example, the bumper may at least partially surround model element 402. For example, the bumper may be adjacent to one side of model element 402, two sides of model element 402, or the like. As shown by reference number 440, based on user interaction with model element 403, a user indicates that model element 403 is to be designated a secondary model element associated with primary model element 402. As shown by reference number 445, a user may select another type of representation for model element 403 (e.g., a "Fuse panel").

As shown in FIG. 4E, and by reference number 450, model element 403 is consolidated into a fuse panel for model element 402, designated secondary model element 402". Assume that secondary model element 402" is associated with the same run-time notification parameters as secondary model elements 402'. In this way, multiple model elements may be designated as secondary model elements associated with a primary model element and may be consolidated, thereby reducing visual noise and causing the model that includes the primary model element and the second model elements to resemble a high-level model.

Figure 4F:
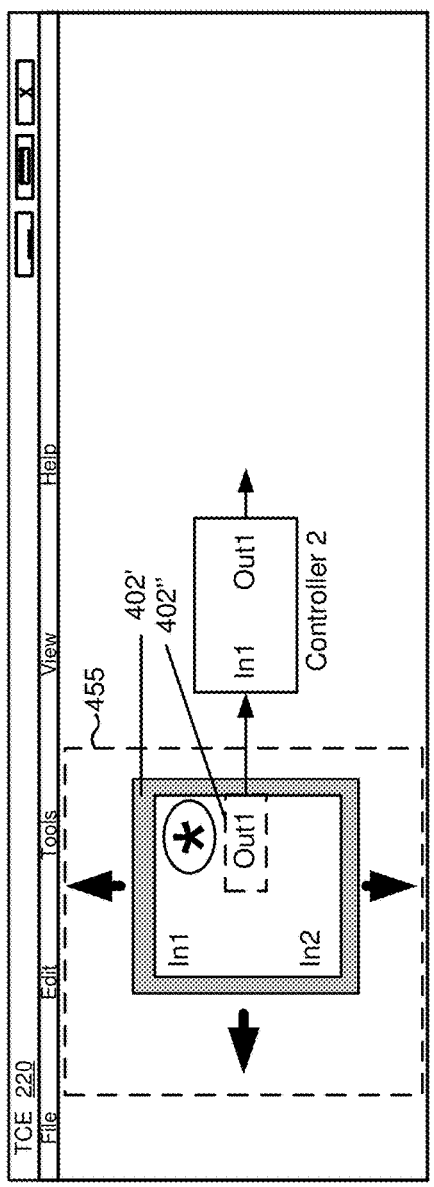
Figure 4G:
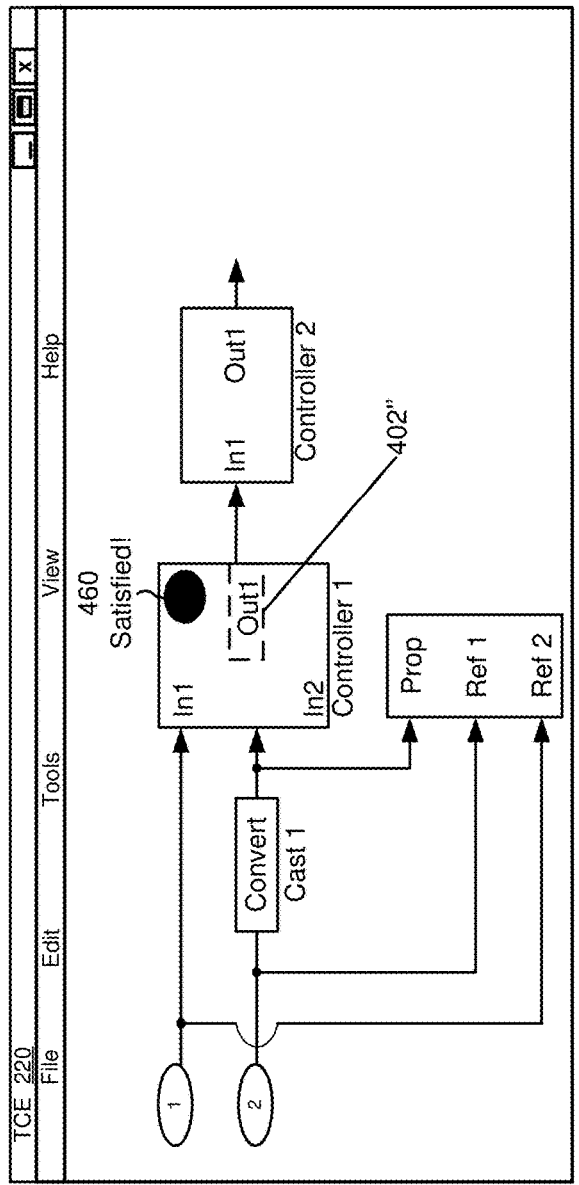

As shown in FIG. 4F, and by reference number 455, assume that secondary model elements 402' are executed, thereby satisfying the run-time notification condition but secondary model element 402" is not executed. As shown in FIG. 4G, secondary model elements 402' de-consolidate out of the bumper, thereby allowing the user to view secondary model elements 402'. As shown by reference number 460, client device 210 causes the user interface to provide an indication that the condition for expanding secondary model elements 402' has been satisfied. Because secondary model element 402" has not executed, secondary model element 402" remains consolidated. In another example, based on the condition for model element 402" being satisfied, the fuse panel representation may de-consolidate and client device 210 may cause model element 403 to be displayed.

As indicated above, FIGS. 4A-4G are provided merely as an example. Other examples are possible and may differ from what was described with regard to FIGS. 4A-4G.

Figure 5A:
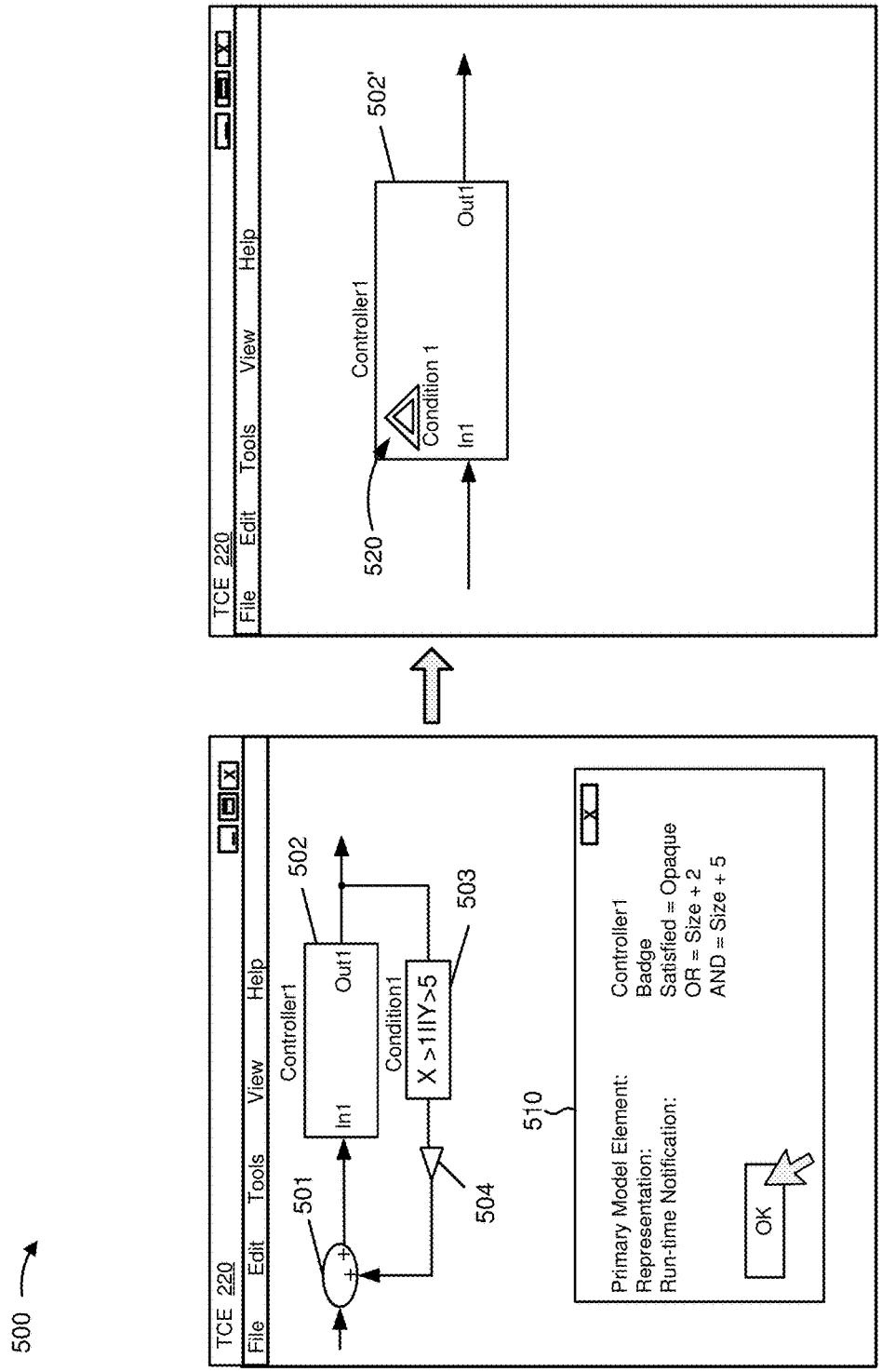
FIGS. 5A-5C are diagrams of an example implementation of consolidating a set of secondary model elements.
Figure 5B:
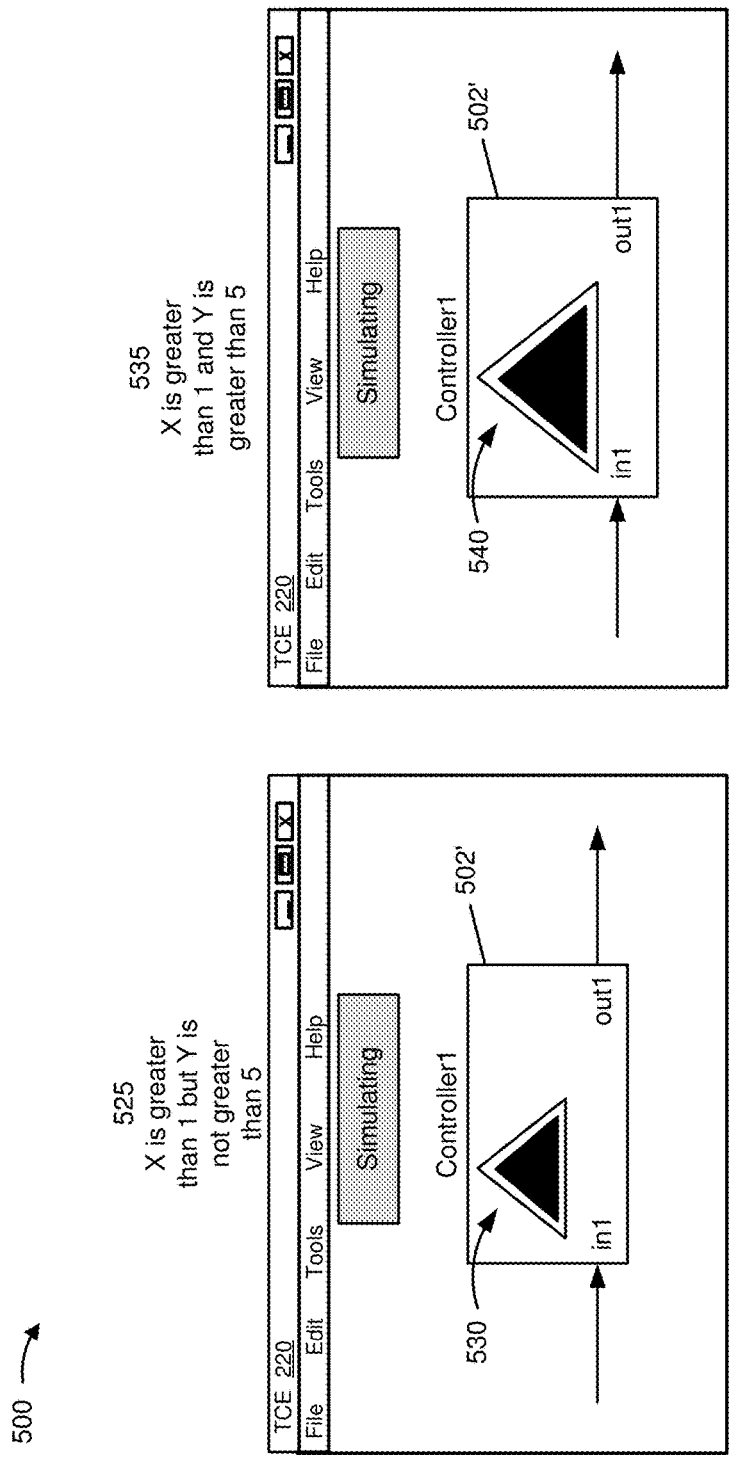
Figure 5C:
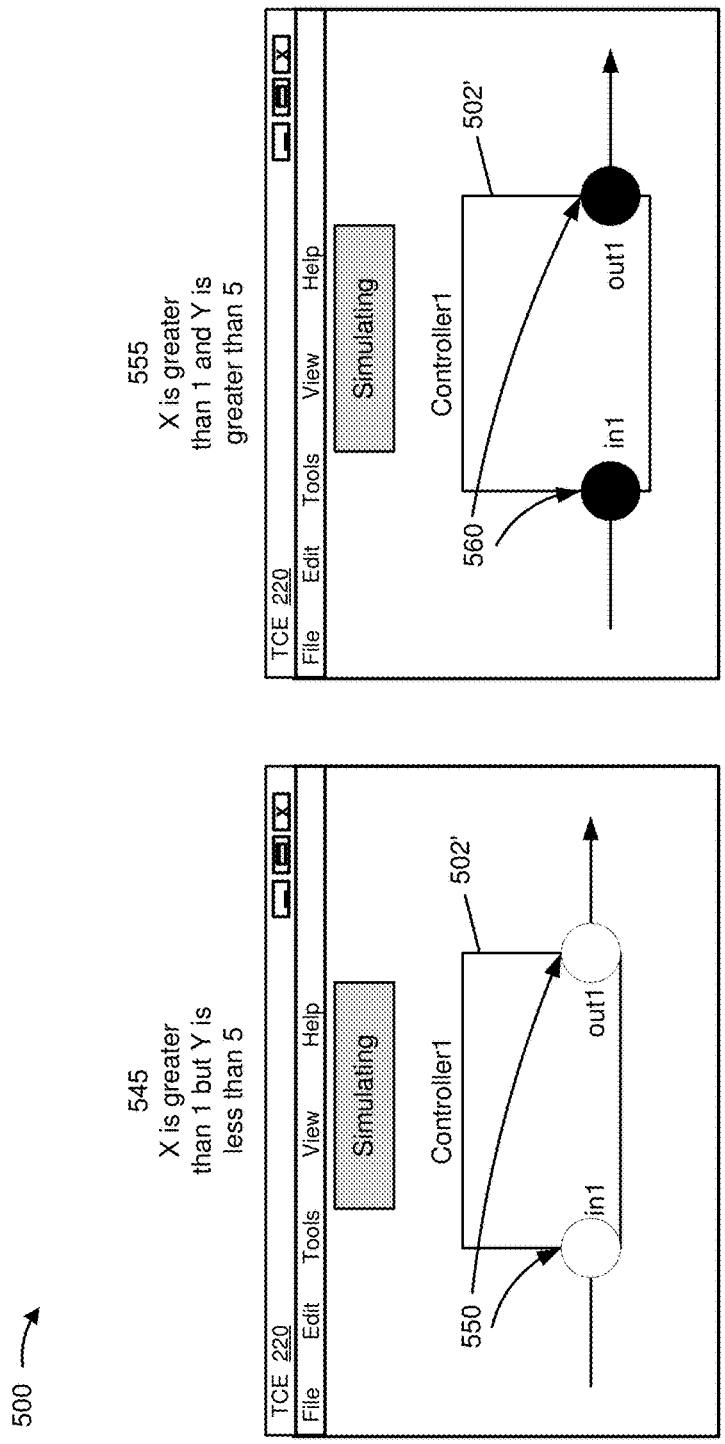

FIGS. 5A-5C are diagrams of an example implementation 500 of consolidating a set of secondary model elements.

As shown in FIG. 5A, a model may include a set of model elements. For example, an add block may be a model element 501 that adds a set of input signals and produces an output signal. In this example, Controller1 is a model element 502 associated with performing a particular algorithm on an input signal In1 to produce an output signal Out1. In this example, Condition1 is a model element 503 associated with evaluating a conditional statement that, if true, causes a gain block model element 504 to perform an operation on a signal. The condition of Condition1 indicates that it will be satisfied when "X>1," or when "Y>5," or when "X>1" and "Y>5."

As further shown in FIG. 5A, and by reference number 510, an editor window is provided via a user interface to establish a primary model element and one or more secondary model elements. The user selects Controller1, model element 502, as the primary element and selects a particular type of representation for a set of secondary model elements (e.g., "Badge"). Assume that the user selects model elements 501, 503, and 504 as secondary model elements 502' associated with primary model element 502. The user selects as a run-time notification that the badge be opaque when the condition of Condition1 is satisfied. The user selects that the badge undergo a first size increase when the condition is satisfied by either X>1 or Y>5 but not X>1 and Y>5. The user selects the badge to undergo a second size increase when the condition is satisfied by X>1 and Y>5.

As further shown in FIG. 5A, based on user confirmation of the parameters of primary model element 502 and secondary model elements 502', a "badge" for secondary model elements 502' may be displayed within primary model element 502, as shown by reference number 520. The badge indicates that secondary model elements 502' are consolidated, thereby permitting the user to view primary model element 502 without visual noise as a result of also having secondary model elements 502' be displayed.

As shown in FIG. 5B, and by reference number 525, during simulation the condition of Condition1 is satisfied by X>1 but not by Y>5. As shown by reference number 530, client device 210 causes the badge to be opaque because the condition of Condition1 is satisfied. Client device 210 causes the badge to undergo the first size increase because the condition is satisfied by either X>1 or Y>5 but not by both X>1 and Y>5. As shown by reference number 535, during simulation the condition of Condition 1 is satisfied by X>1 and by Y>5. As shown by reference number 540, client device 210 causes the badge to undergo the second increase because the condition is satisfied by both X>1 and Y>5. In this way, a representation of a set of secondary model elements can provide valuable information regarding the set of secondary model elements without de-consolidating the set of secondary model elements.

As shown in FIG. 5C, in another example, secondary model elements 502' may be represented by a set of port pimple-type representations associated with an input port of controller1 and an output port of controller1. As shown by reference number 545, during simulation the condition of Condition1 is satisfied by X>1 but not by Y>5. As shown by reference number 550, client device 210 causes the set of port pimple-type representations to be opaque because the condition of Condition1 is satisfied. As shown by reference number 555, during simulation the condition of Condition 1 is satisfied by X>1 and by Y>5. As shown by reference number 560, client device 210 causes the port pimple-type representation to be filled in because the condition is satisfied by both X>1 and Y>5. In this way, another representation of a set of secondary model elements can provide valuable information regarding the set of secondary model elements without de-consolidating the set of secondary model elements.

As indicated above, FIGS. 5A-5C are provided merely as an example. Other examples are possible and may differ from what was described with regard to FIGS. 5A-5C.

FIG. 6 is a flow chart of an example process 600 for consolidating a set of secondary model elements. In some implementations, one or more process blocks of FIG. 6 may be performed by client device 210. In some implementations, one or more process blocks of FIG. 6 may be performed by another device or a set of devices separate from or including client device 210, such as TCE 220 and/or server device 230.

As shown in FIG. 6, process 600 may include receiving a model (block 610). For example, client device 210 (e.g., TCE 220) may receive a model (e.g., a graphical model). In some implementations, client device 210 (e.g., TCE 220) may receive the model based on a user creating the model. For example, a user may cause client device 210 to create or open a user interface. The user may then cause client device 210 add one or more model blocks and/or model elements to the user interface to create the model. In some implementations, client device 210 may receive a command, from the user, that indicates that a model block and/or a model element is to be added to the user interface. Client device 210 may receive the command based, for example, on detecting a selection of a particular menu item, entry of a particular textual or audible input from the user, and/or entry of some other predetermined input that indicates a desire to add a model block and/or a model element to the user interface. As another example, client device 210 may receive input (e.g., a drag and drop) that indicates that a model block and/or a model element, included in a block library and/or a model element library associated with TCE 220, is to be added to the user interface. Based on the command, client device 210 may add the model block and/or the model element to the user interface.

In some implementations, client device 210 may receive information identifying the model, such as a name of the model, and information identifying a memory location at which the model is stored. The memory location may be located within client device 210 or external to, and possibly remote from, client device 210. Client device 210 may, based on receiving the request, retrieve the model from the memory location.

As further shown in FIG. 6, process 600 may include determining a primary model element and a set of secondary model elements of the model associated with the primary model element (block 620). For example, client device 210 may determine a primary model element of the model and a set of secondary model elements of the model associated with a primary model element. A primary model element may refer to a model element that is designated as a primary model element. For example, a user may designate a particular model element as a primary model element based on an interaction with a user interface. In some implementations, client device 210 may identify a particular model element as the primary model element, such as by processing the model, comparing the model to another model, receiving a selection of secondary model elements and determining a primary model element connected thereto, or the like. For example, client device 210 may determine that a particular model element, such as a controller model element, is commonly selected as a primary model element associated with a secondary model element, such as a data type conversion model element.

A secondary model element may refer to a model element that is designated as a secondary model element and may be graphically represented, via a user interface, to reduce visual noise. For example, a user may designate a particular model element as a secondary model element based on an interaction with a user interface. In some implementations, client device 210 may determine that a model element is a secondary model element based on a user identifying a primary model element, based on matching the model element to other model elements that are designated as secondary model elements, based on a type of the model element, or the like. In some implementations, a secondary model element may be associated with multiple separate primary model elements.

In some implementations, a secondary model element and/or a primary model element may be selected using a particular interaction with a user interface. For example, a user may utilize a selection tool (e.g., a lasso tool, a marquee tool, a right click), a verbal indication, a text-based indication, or the like. In some implementations, a secondary model element and/or a primary model element may be selected from a block library. For example, client device 210 may receive user input dragging and dropping a secondary model element associated with a particular consolidated representation (e.g., a fuse panel representation, a bumper representation, or the like) to associate the secondary model element with a primary model element. Additionally, or alternatively, a user may select a port of a primary model element, such as an input port, an output port, or the like, to indicate that the port is to be associated with a secondary model element. In some implementations, client device 210 may provide an element of a user interface, such as a menu, a pop-up, a keyboard shortcut, a touch screen gesture, a gesture recognition gesture, or the like, with which to receive user input selecting a secondary model element and/or a primary model element.

In some implementations, client device 210 may provide a suggestion of a model element from the block library, based on other model elements of the model. In some implementations, client device 210 may provide a secondary model element and a primary model element that are already associated and/or have configured parameters associated therewith. In some implementations, client device 210 may provide, via a user interface associated with TCE 220, a set of selection buttons for adding a commonly-used secondary model element, which is associated with a particular type of representation, to a primary model element. For example, client device 210 may provide a hotkey for selecting a data type conversion and having the data type conversion added to a model element as a fuse panel. In this case, client device 210 may process one or more models to identify the commonly-used secondary model element and provide the commonly-used secondary model element for selection.

In some implementations, multiple model elements may be designated as primary model elements associated with the same set of secondary model elements. For example, client device 210 may determine that a set of conditional statement model elements are to be designated as secondary model elements associated with a set of multiple controller model elements that are to be designated as primary model elements. Additionally, or alternatively, the model may include multiple separate primary model elements associated with one or more sets of secondary model elements. For example, the model may include a first primary model element associated with a first set of secondary model elements and a second primary model element associated with a second set of secondary model elements. Additionally, or alternatively, a first primary model element, associated with a first set of secondary model elements, may be included in a second set of secondary model elements associated with a second primary model element. In other words, a primary model element may be associated with a secondary model element that is a primary model element for another secondary model element. In some implementations, a particular primary model element may have multiple sets of secondary model elements associated with multiple different representations, multiple similar representations, or the like. For example, client device 210 may determine that a first set of secondary model elements is to be represented as a bumper for a particular primary model element and that a second set of secondary model elements is to be represented as a badge for the same primary model element.

In some implementations, client device 210 may generate the set of secondary model elements. For example, client device 210 may receive, via a user interface, data type information and a user interaction (e.g., a mouse click) on an aspect of a primary element (e.g., a port), and client device 210 may generate a secondary model element associated with the primary model element and/or a representation thereof. In this case, client device 210 may generate a representation (e.g., a port pimple) for the secondary model element and provide the representation to represent the secondary model element, and may de-consolidate the secondary model element from the representation based on a user interaction or a run-time event.

As further shown in FIG. 6, process 600 may include determining a set of parameters associated with representing the set of secondary model elements (block 630). For example, client device 210 may determine a set of parameters associated with representing the set of secondary model elements. In some implementations, client device 210 may determine the set of parameters based on a user indication of a set of preferences. For example, client device 210 may provide an element of a user interface, such as a parameter menu, and a user may select one or more parameters from the parameter menu provided via a user interface. Additionally, or alternatively, client device 210 may determine the set of parameters based on a set of default parameters associated with types of model elements included in the set of secondary model elements. In some implementations, one or more parameters may be related. For example, a type of representation parameters may be related with a run-time notification parameter, a user interaction parameter, or the like.

The set of secondary model elements may be associated with a particular set of parameters, such as a type of representation parameter, in some implementations. For example, the set of secondary model elements may be represented by a bumper (e.g., an indication that borders around a primary model element to indicate that signals being provided to the primary model element and/or provided from the primary model element may be altered by the set of secondary model elements), as described herein with regard to FIGS. 4A-4G. In another example, a set of secondary model elements may be represented by a fuse panel that consolidates the set of secondary model elements as a representation within the primary model element and associated with a port of the primary model element, as described herein with regard to FIGS. 4A-4G. In another example, the set of secondary model elements may be represented by a badge displayed in association with the primary model element, as described herein with regards to FIGS. 5A-5B. In another example, information regarding the set of secondary model elements may be represented by a badge displayed in association with the primary model element, such as a status, an alert, or the like relating to the set of secondary model elements. In another example, the set of secondary model elements may be represented by a port pimple displayed in association with the primary model element, as described herein with regards to FIG. 5C. In another example, the set of secondary model elements may be represented without a visual component. For example, the set of secondary model elements may be consolidated into a connector, and the user interface may provide information regarding the set of secondary model elements when a user interacts with the connector. Although implementations are described herein with regard to a bumper, a badge, a fuse panel and a port pimple, implementations described herein may refer to another type of representation of a set of secondary model elements that is associated with a primary model element.

The set of secondary model elements may be associated with another parameter, such as a parameter associated with a run-time notification, in some implementations. For example, the representation of the set of secondary model elements may be altered based on an occurrence of a run-time event, such as an alert being generated for a user during execution of the set of secondary model elements, the primary model element, or the like. In some implementations, the representation of the set of secondary model elements may be altered to provide a run-time notification associated with the set of secondary model elements being executed. For example, client device 210 may de-consolidate the set of secondary model elements when a condition of the model is satisfied that causes a particular secondary model element to be executed. Additionally, or alternatively, client device 210 may provide an alert via the representation of the set of secondary model elements when a threshold value is satisfied, a condition is satisfied, or the like. For example, client device 210 may alter a model (e.g., a representation of a model) by altering the size, shape, coloration, and/or iconography of a badge-type notification to indicate that a particular value associated with a particular secondary model element is reached. Further to the example, client device 210 may cause the badge-type representation to be removed from display when a notification is not generated. For example, when the badge-type representation is associated with providing information regarding an error associated with a model element, the badge-type representation may be omitted from display when no error is generated for the model element and provided for display when an error is generated for the model element. Additionally, or alternatively, client device 210 may alter the representation of the set of secondary model elements when a diagnostic notification, such as an error, a warning, or the like, is generated. For example, when a data type conversion model element incurs an overflow diagnostic notification, a fuse-panel representation of the set of secondary model elements may de-consolidate to highlight the source of the diagnostic notification and provide the user with information indicating that an overflow is occurring.

The set of secondary model elements may be associated with another parameter, such as a user interaction parameter, in some implementations. For example, the representation of the set of secondary model elements may be altered based on a user interaction by clicking on the set of secondary model elements, clicking on the primary model element, performing a mouse-over of the primary model element and/or the set of secondary model elements, or the like. In some implementations, the user interaction parameter may be associated with altering a representation of the set of secondary model elements based on a user interaction. For example, a badge representation may change size, shape, visibility, or the like after a user interaction event, such as when a user clicks on the badge, performs a mouse-over of the badge, or the like. Additionally, or alternatively, when the set of secondary model elements is consolidated without any representation, the user interaction parameter may be associated with making the set of model elements visible (e.g., de-consolidating the set of secondary model elements) when a user clicks on a primary model element associated with the set of secondary model elements, performs a mouse-over of a particular model location associated with the set of secondary model elements, or the like.

The set of secondary model elements may be associated with another parameter, such as a type of notification parameter, in some implementations. For example, when a run-time notification parameter and/or a user interaction parameter is satisfied, client device 210 may cause the set of secondary model elements to consolidate, de-consolidate, change shape, change consolidation type, change visibility, or the like. Additionally, or alternatively, client device 210 may cause a badge to change shape, size, color, iconography, or the like. Additionally, or alternatively, client device 210 may cause the badge to flash, to become visible, to provide an audible alert, or the like. For example, when a warning occurs with respect to a value of a signal of the set of secondary model elements, client device 210 may cause the badge to become a yellow warning symbol. Additionally, or alternatively, when a value of a signal associated with a secondary model element increases, client device 210 may cause the badge to increase in size. Additionally, or alternatively, when a secondary model element is associated with converting between a first data type and a second data type and the first data type is the second data type, client device 210 may cause the badge to disappear, thereby indicating that the data type conversion is not occurring, is trivial, or the like.

In some implementations, the set of secondary model elements may be associated with a level parameter. For example, a model may have multiple levels of granularity with successive levels showing increasing detail regarding operation of the model. In this case, the set of secondary model elements may be associated with information identifying the level, of the multiple levels, at which the set of secondary model elements is to be shown and identifying other levels at which a consolidated representation is to be provided (e.g., a badge representation, a fuse panel representation, etc.) instead. Additionally, or alternatively, client device 210 may provide a navigation tree with which to alter a level with which the model is viewed, and the level parameter may indicate at which levels of the navigation tree the set of secondary model elements are to be provided for display. In some implementations, a level may include a set of model elements assigned to another level. For example, when a first set of model elements is assigned to a first level and a second set of model elements is assigned to a second level, client device 210 may cause the second set of model elements to be displayed when the second level is selected and may cause the first set of model elements and the second set of model elements to be displayed when the first level is selected. In some implementations, the level parameter may be determined based on a representation type. For example, a first level may be associated with badge representations, a second level may be associated with fuse panel representations, or the like.

In some implementations, client device 210 may store information associated with the set of parameters and the set of secondary model elements. For example, client device 210 may store information identifying the set of secondary model elements and parameters associated therewith in a block library for selection by a user for use in the model, in another model, or the like. Additionally, or alternatively, client device 210 may store information associated with the primary model element and may provide, via the user interface for user selection, a primary model element with a set of secondary model elements that include a particular set of parameters, thereby simplifying model development.

As further shown in FIG. 6, process 600 may include providing information associated with representing the set of secondary model elements based on the set of parameters (block 640). For example, client device 210 may provide information associated with representing the set of secondary model elements based on the set of parameters. In some implementations, client device 210 may cause the set of secondary model elements to be consolidated in a display based on the set of parameters, such as based on a parameter describing a type of consolidation. Additionally, or alternatively, client device 210 may cause the set of secondary model elements to be removed from the display. In some implementations, client device 210 may generate a badge, a bumper, or the like associated with representing the set of secondary model elements in the display. Additionally, or alternatively, client device 210 may generate a label that describes the set of secondary model elements, a function of the set of secondary model elements, or the like that are consolidated into a badge, a bumper, or the like.

Additionally, or alternatively, client device 210 may generate an iconic representation of the set of secondary model elements that may be provided for display and with which a user may interact. For example, client device 210 may generate a bumper that includes a set of icons representing each of the set of secondary model elements. In this case, the user may select, via the user interface, a particular icon to deconsolidate a particular secondary model element represented thereby, view information regarding the particular secondary model element, or the like.

In some implementations, client device 210 may provide, to a user, information associated with representing the set of secondary model elements. For example, client device 210 may provide information identifying the set of secondary model elements, the primary model element, the set of parameters, or the like to a user. Additionally, or alternatively, client device 210 may provide information to a block library. For example, client device 210 may store information identifying the primary model element, the set of secondary model elements, or the like to the block library for future selection by the user, by another user, or the like.

As further shown in FIG. 6, process 600 may include selectively causing the information associated with representing the set of secondary model elements to be updated (block 650). For example, client device 210 may selectively cause the information associated with representing the set of secondary model elements to be updated. In some implementations, client device 210 may cause information associated with representing the set of secondary model elements to be updated based on an event, such as a run-time occurrence, a user interaction occurrence, or the like. For example, when the representation of the set of secondary model elements is associated with being altered to provide a run-time notification, and when the run-time notification is activated (e.g., by a value occurring, a condition being satisfied, a quantity of time elapsing, or the like), client device 210 may alter the representation of the set of secondary model elements based on a parameter. Additionally, or alternatively, client device 210 may cause the set of secondary model elements and/or the representation thereof to be altered based on a user interaction with a user interface based on a parameter. For example, client device 210 may cause a secondary model element to be provided for display in the user interface, removed from display in the user interface, represented in a different manner in the user interface, or the like.

In some implementations, client device 210 may cause the information representing the set of secondary model elements to be updated based on executing the model. For example, while executing model elements of the model, client device 210 may determine that a value associated with the model has occurred, and may alter the model element (e.g., may alter a representation of the model element by altering a color, a size, a shape, or the like of a badge representation to indicate that the value has occurred). Additionally, or alternatively, client device 210 may cause a representation to consolidate the set of secondary model elements, de-consolidate the set of secondary model elements, or the like based on a value associated with the model, a user interaction with the model via a user interface, a quantity of time, or the like.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

In this way, a set of secondary model elements may be consolidated and represented in a model so that visual noise is decreased thereby reducing time required to alter a model, understand a model, or the like. In this way, model creation and editing is improved.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

The term program code is to be broadly interpreted to include text-based code that may be automatically executed (e.g., C code, C++ code, Hardware Description Language (HDL) code, very-high-speed integrated circuits (VHSIC) HDL (VHDL) code, Verilog, Java, and/or other types of hardware or software based code that may be compiled and/or synthesized); binary code that may be executed (e.g., executable files that may directly be executed by an operating system, bitstream files that can be used to configure a field programmable gate array (FPGA), Java byte code, object files combined together with linker directives, source code, makefiles, etc.); text files that may be executed in conjunction with other executables. In one example, program code may include different combinations of the above-identified classes (e.g., text-based code, binary code, text files, etc.). Alternatively, or additionally, program code may be of any type, such as function, script, object, etc., and a portion of program code may include one or more characters, lines, etc. of the program code.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A computer-readable medium storing instructions, the instructions comprising:
one or more instructions that, when executed by one or more processors, cause the one or more processors to:
provide a representation of a model, that includes a set of model elements, for display via a user interface,
the set of model elements including a first model element that operates in connection with a second model element;
select the first model element from the set of model elements based on a user input,
the first model element including a set of parameters associated with describing the first model element,
the set of parameters associated with describing the first model element including a particular parameter associated with determining a type of consolidated representation of the first model element to provide for display via the user interface;
determine a consolidated representation of the first model element to be provided for display via the user interface based on the particular parameter,
the consolidated representation of the first model element being in relation to the second model element and altering a representation of the second model element, the altering comprising associating the consolidated representation of the first model element with the representation of the second model element; and provide the consolidated representation of the first model element for display via the user interface; and
selectively update the user interface based on a detected event,
the selectively updating the user interface including at least one of changing the user interface to cause the first model element to be displayed or altering the consolidated representation of the first model element to provide information associated with the detected event.

2. The computer-readable medium of claim 1, where the one or more instructions, that cause the one or more processors to provide the consolidated representation of the first model element for display, further cause the one or more processors to:
remove the first model element from display via the user interface, the first model element being associated with a port of the second model element; and
include an indication of the first model element as a badge-type of representation associated with the second model element, the badge-type of representation being associated with an icon being displayed in relation to the second model element.

3. The computer-readable medium of claim 2, where the one or more instructions, when executed by the one or more processors, further cause the one or more processors to:
select a particular view of the set of model elements,
the first model element including a parameter indicating that the first model element is to be removed from display when the particular view is selected; and
where the one or more instructions, that cause the one or more processors to remove the first model element from display via the user interface, further cause the one or more processors to:
remove the first model element from display based on selecting the particular view.

4. The computer-readable medium of claim 2, where the one or more instructions, when executed by the one or more processors, further cause the one or more processors to:
detect the event,
the event being a user interaction associated with selecting the first model element;
and where the one or more instructions, that cause the one or more processors to selectively update the user interface, further cause the one or more processors to:
remove the badge-type of representation and provide the first model element for display based on detecting the event; and
provide one or more user interface elements associated with modifying information associated with the first model element.

5. The computer-readable medium of claim 2, where the one or more instructions, when executed by the one or more processors, further cause the one or more processors to:
detect, during execution of the set of model elements, the event,
the event being an alert associated with the first model element; and
where the one or more instructions, that cause the one or more processors to selectively update the user interface, further cause the one or more processors to:
alter the badge-type of representation based on the alert.

6. The computer-readable medium of claim 1, where the one or more instructions, when executed by the one or more processors, further cause the one or more processors to:
detect, during execution of the set of model elements, the event,
the event being related to a status of the first model element during the execution of the set of model elements; and
where the one or more instructions, that cause the one or more processors to selectively update the user interface, further cause the one or more processors to:
alter the consolidated representation of the first model element to provide information regarding the status of the first model element.

7. The computer-readable medium of claim 1, where the one or more instructions, that cause the one or more processors to provide the consolidated representation of the first model element for display, further cause the one or more processors to:
remove the first model element from display via the user interface; and
include an indication of the first model element as a bumper-type representation associated with the second model element,
the bumper-type representation being associated with a border at least partially surrounding the second model element.

8. The computer-readable medium of claim 7, where the one or more instructions, when executed by the one or more processors, further cause the one or more processors to:
detect the event,
the event being associated with execution of the first model element; and where the one or more instructions, that cause the one or more processors to selectively update the user interface, further cause the one or more processors to:
alter the border surrounding the second model element to provide an indication of the event.

9. The computer-readable medium of claim 7, where the one or more instructions, when executed by the one or more processors, further cause the one or more processors to:
detect the event,
the event being a user interaction with the border surrounding the second model element;
where the one or more instructions, that cause the one or more processors to selectively update the user interface, further cause the one or more processors to:
provide one or more user interface elements associated with altering the first model element based on the user interaction with the border surrounding the second model element; and
alter the consolidated representation of the first model element based on detecting a user interaction with the one or more user interface elements.

10. The computer-readable medium of claim 7, where the one or more instructions, when executed by the one or more processors, further cause the one or more processors to:
classify a set of levels of the model that includes the set of model elements,
the set of levels corresponding to a granularity with which information associated with the set of model elements is provided for display via the user interface determine that a particular level, of the set of levels, is selected for display,
the particular level corresponding to the consolidated representation of the first model element being displayed; and
where the one or more instructions, that cause the one or more processors to provide the consolidated representation of the first model element for display, are further to:
provide the consolidated representation of the first model element for display based on the determining that the particular level is selected for display.

11. A method, comprising:
selecting, based on user input, multiple model elements from a set of model elements, of a model, being provided for display via a user interface as secondary model elements, the selecting the multiple model elements as the secondary model elements being performed by a device;
selecting a model element from the set of model elements being provided for display via the user interface as a primary model element,
the selecting the model element as the primary model element being performed by the device,
the primary model element operating in connection with the secondary model elements;
representing information regarding the secondary model elements via a graphical alteration associated with the primary model element,
the graphical alteration being a consolidated representation of the secondary model elements via the primary model element to indicate a presence of the secondary model elements in the model,
the graphical alteration associating the consolidated representation of the secondary model elements with a representation of the primary model element,
the graphical alteration including removing the secondary model elements from display via the user interface, and
the representing information regarding the secondary model elements being performed by the device;
detecting a run-time event associated with the primary model element and the consolidated representation of the secondary model elements,
the detecting the event being performed by the device; and
selectively de-consolidating the secondary model elements based on detecting the event,
the selective deconsolidating being performed by the device.

12. The method of claim 11, where representing the information regarding the secondary model elements via the graphical alteration associated with the primary model element further comprises:
adding a graphical badge to a representation of the primary model element, the graphical badge representing information associated with the secondary model elements.

13. The method of claim 11, where representing the information regarding the secondary model elements via the graphical alteration associated with the primary model element further comprises:
adding a graphical border to a representation of the primary model element, the graphical border representing the secondary model elements,
the secondary model elements being associated with affecting input information and/or output information associated with the primary model element.

14. The method of claim 11, where representing the information regarding the secondary model elements via the graphical alteration associated with the primary model element further comprises:
adding a panel to a port of the primary model element,
the panel representing an interaction of the secondary model elements with the port.

15. The method of claim 11, further comprising:
monitoring execution of the set of model elements;
determining that a condition associated with the set of model elements is satisfied; and
performing, based on determining that the condition associated with the set of model elements is satisfied, at least one of:
consolidating the secondary model elements into the graphical alteration associated with the primary model element;
de-consolidating the secondary model elements from the graphical alteration associated with the primary model element; or
altering an appearance of the graphical alteration of the secondary model elements.

16. The method of claim 15, where altering the appearance of the graphical alteration of the secondary model elements further comprises at least one of:
altering a size of the graphical alteration;
altering a color of the graphical alteration;
altering a visibility of the graphical alteration; or
altering an iconography of the graphical alteration.

17. A device, comprising:
one or more processors to:
identify a primary model element of a set of model elements,
select one or more secondary model elements of the set of model elements based on user input, the one or more secondary model elements operating in connection with the primary model element;
consolidate the one or more secondary model elements into a consolidated representation of the one or more secondary model elements,
the consolidated representation of the one or more secondary model elements being in relation to the primary model element and altering a representation of the primary model element,
the altering comprising associating the consolidated representation of the one or more secondary model elements with the primary model element; and
selectively de-consolidate the one or more secondary model elements based on detecting a run-time event.

18. The device of claim 17, where the one or more processors, are further to:
selectively alter the consolidated representation of the one or more secondary model elements based on detecting at least one of a user interaction or a run-time event to provide information regarding the user interaction or the run-time event.

19. The device of claim 17, where the one or more processors are further to:
select the primary model element as a secondary model element of another primary model element; and
consolidate the primary model element into a representation of the primary model element associated with the other primary model element.

20. The device of claim 17,
where the primary model element is a connector; and
where the one or more processors, when consolidating the one or more secondary model elements, are further to:
cause the one or more secondary model elements to be consolidated into the connector;
detect a user interaction with the connector; and
where the one or more processors, when selectively de-consolidating the one or more secondary model elements, are further to:
de-consolidate the one or more secondary model elements based on detecting the user interaction with the connector.

21. The device of claim 17, where the one or more processors, when selecting the one or more secondary model elements, are further to:
determine that the one or more secondary model elements are associated with performing one or more data type conversions for the primary model element; and
identify the one or more secondary model elements based on determining that the one or more secondary model elements are associated with performing the one or more data type conversions for the primary model element.

22. The device of claim 17, where the one or more processors, when selectively de-consolidating the one or more secondary model elements, are to:
identify a layer, of a set of layers, associated with the user interaction or the run-time event,
the set of layers being associated with a set of secondary model elements,
the set of secondary model elements including the one or more secondary model elements,
the layer being associated with the one or more secondary model elements; and
de-consolidate the one or more secondary model elements based on the layer.

23. The device of claim 17, where the one or more processors, are further to:
receive an indication, via a user interface, of a display mode of the user interface; and
where the one or more processors, when selectively de-consolidating the one or more secondary model elements, are to:
selectively de-consolidate the one or more secondary model elements based on the display mode of the user interface.

24. A device, comprising:
one or more processors to:
detect a user interaction, via a user interface, with a primary model element of a set of model elements;
generate a secondary model element separate from the primary model element that operates in connection with the primary model element based on detecting the user interaction with the primary model element,
the secondary model element being associated with a particular data type; and
provide a consolidated representation of the secondary model element for display within the user interface,
the consolidated representation of the secondary model element being in relation to the primary model element and altering a representation of the primary model element,
the altering comprising associating the consolidated representation of the secondary model element with the representation of the primary model element,
the consolidated representation of the secondary model element being a consolidation of the secondary model element.

25. The device of claim 24, where the one or more processors are further to:
receive, via a dialog of the user interface, information indicating the particular data type of the secondary model element; and
where the one or more processors, when generating the secondary model element, are to:
generate the secondary model element based on the particular data type.

26. The device of claim 24, where the one or more processors are further to:
selectively de-consolidate the secondary model element based on detecting a user interaction or a run-time event.

27. The device of claim 24, wherein:
the detected user interaction comprises selection of a port of the primary model element; and
the secondary model element receives:
output from the port of the primary model element, or
provides input to the port of the primary model element.

28. The device of claim 27, wherein:
the secondary model element converts:
the output from the port to the particular data type or from the particular data type, or
the input to the port to the particular data type or from the particular data type.

29. The computer-readable medium of claim 1, wherein the first model element is separate from the second model element.

* * * * *